United States Patent
Pope et al.

[11] Patent Number: 5,112,533
[45] Date of Patent: May 12, 1992

[54] FIRE SUPPRESSING COMPOSITIONS AND METHODS

[76] Inventors: Penny M. Pope, 5557 E. Exeter, Phoenix, Ariz. 85018; Sean O'Bannon, 1818 E. Bell Rd., Space B-20, Phoenix, Ariz. 85022; Steven R. Pope, 5557 E. Exeter, Phoenix, Ariz. 85018

[21] Appl. No.: 467,987

[22] Filed: Jan. 22, 1990

[51] Int. Cl.$^5$ .............................................. C09K 21/00
[52] U.S. Cl. ............................ 252/607; 252/2; 252/3; 252/7; 252/602; 252/606; 106/18.13; 106/18.23
[58] Field of Search .................. 252/2, 3, 606, 607, 252/602, 7; 106/18.13, 18.23

[56] References Cited

U.S. PATENT DOCUMENTS

| | | |
|---|---|---|
| 2,135,365 | 11/1938 | Timpson .................................. 23/11 |
| 2,416,447 | 2/1947 | Laughlin et al. ......................... 92/3 |
| 2,858,895 | 11/1958 | Connell ................................... 169/1 |
| 2,901,427 | 8/1959 | Steppe ...................................... 252/5 |
| 2,958,658 | 11/1960 | McIntosh .................................. 252/3 |
| 3,196,108 | 7/1965 | Nelson ...................................... 252/2 |
| 3,464,921 | 9/1969 | Erler et al. ............................... 252/1 |
| 3,862,854 | 1/1975 | Zeigerson et al. .................... 117/136 |
| 3,915,911 | 10/1975 | Horiguchi ............................. 260/17.5 |
| 3,962,208 | 6/1976 | Zeigerson et al. .............. 260/124 R |
| 4,019,918 | 4/1977 | Wills, Jr. ................................. 106/90 |
| 4,095,985 | 6/1978 | Brown ................................ 106/15 FP |
| 4,820,345 | 4/1987 | Berg et al. .......................... 106/18.12 |
| 4,988,576 | 1/1991 | Lin ........................................ 428/537.1 |

*Primary Examiner*—Richard D. Lovering
*Assistant Examiner*—N. Bhat

[57] ABSTRACT

Fire suppressing compositions are produced by reaction of lignosulfonates with carbonate of soda to produce low-cost chemical reagents useful for fighting fires in progress or for treating flammable materials to render them non-flammable. Methods for producing the fire retardant compositions in liquid, foam or adhesive form are also disclosed.

21 Claims, No Drawings

FIRE SUPPRESSING COMPOSITIONS AND METHODS

FIELD OF THE INVENTION

This invention relates generally to compositions and methods for converting flammable substances into non-flammable substances at those temperatures usually encountered in forest fires or during the combustion of man-made structures. More particularly, the invention involves the chemical modification of calcium lignosulfonate, a waste product of the wood processing industry, to produce a composition having enhanced fire suppressing properties.

BACKGROUND AND PRIOR ART

Fire is a continuing threat to life and property throughout the world. Forest, brush and grassland fires cause enormous damage each year, not only in terms of the value of timber, wildlife and livestock destroyed, and the waste and expenditure of money and human resources in fire-fighting efforts, but also in terms of the catastrophic effect on erosion, watershed equilibrium and related problems. Similarly, fire is responsible for the loss of billions of dollars annually in the destruction of buildings, manufacturing facilities, and other man-made structures in the populated areas of the world, and is a major threat to human life.

Over the years, numerous methods for combating such fires have been developed. The use of water, foams, chemicals and other quenching materials are well known. Efforts have concentrated not only on compositions and methods for extinguishing fires already in progress, but also for the prevention of fires by pretreatment of combustible surface areas, structures, fabrics, and the like to render them less combustible. Very substantial efforts have been expended in the area of chemical retardants or suppressants, and a number of these have been adopted and used for specific purposes.

For example, borates, carbonates, bicarbonates and other salts have been demonstrated to have useful properties as fire fighting chemicals. Representative prior art patents showing such use, starting in the early part of the century, and continuing until more recent times, include U.S. Pat. No. 1,030,909 to Mesturino; U.S. Pat. No. 1,339,488 to Weiss; U.S. Pat. No. 1,813,367 Thompson; U.S. Pat. No. 2,875,044 to Dunn; U.S. Pat. No. 3,537,873 and U.S. Pat. No. 3,719,515 to Degginger; U.S. Pat. No. 4,021,464 to Mayerhoefer et al; U.S. Pat. No. 4,076,580 to Panusch et al; U.S. Pat. No. 4,095,985 to Brown; and U.S. Pat. No. 4,725,382 to Lewchalermwong. However, although the fire inhibiting properties of the borates, carbonates and bicarbonates have been established, the use of these materials has been limited because of the lack of effective means for dispensing them and their tendency to inhibit plant growth when used in larger quantities.

More recently attention has turned to other chemical agents such as the halogens (fluorine, chlorine, bromine and iodine) and halogenated compounds. Fire retardant compositions making use of these agents are illustrated in U.S. Pat. No. 3,936,414 to Wright et al and U.S. Pat. No. 3,196,108 to Nelson. See also Lyons, *The Chemistry and Uses of Fire Retardants*, John Wiley & Sons, 1970, pages 147, 411. Although effective in this usage, the usefulness is partially limited by the side reactions which may occur in a fire, such as the production of phosgene or diphosgene, the generation of corrosive agents, and the like.

One of the inherent difficulties with most of the chemical compositions found to exhibit fire retardant properties is that they are relatively expensive, and the cost factor militates against applying them in the large quantities as may be required, for example, in combating or preventing forest, brush and grass range fires. For this reason, a considerable amount of effort has been spent in the search for by-product or waste materials which might assist in the problem. Thus, for example, substantial research has been done to determine if calcium lignosulfonate might have any useful fire retardant properties. Calcium lignosulfonates (otherwise known as sulfite lignins or ligninsulfonates) are the waste by-products of the sulfite-pulping process of the paper industry. The sulfite process results in a spent liquor containing lignosulfonates as the principal component. Some 14%-17% of the lignosulfonates are sold for miscellaneous uses which have been developed, but the remainder must be burned or otherwise disposed of, under increasingly restrictive anti-pollution regulations.

Uses of lignosulfonates as components in fire retardant compositions are reported in prior patents such as U.S. Pat. No. 3,464,921 to Erler et al; U.S. Pat. No. 3,862,854 and U.S. Pat. No. 3,962,208 to Zeigerson et al; U.S. Pat. No. 3,915,911 to Horiguchi; and U.S. Pat. No. 4,820,345 to Berg et al. Additionally, U.S. Pat. No. 2,858,895 to Connell discloses a boric acid or borate fire suppressing compound, with lignin sulfonate as a sticking agent; and U.S. Pat. No. 2,901,42 Steppe describes the use of phosphoric acid and/or boric acid or their salts as fire extinguishing compositions, with the inclusion of dried powdered sulfite waste liquor to reduce agglomeration. However, despite the effort that has been put forth, the fire suppressing properties of the lignosulfonates by themselves are not generally regarded as reliable enough to warrant commercialization. The materials may be used under certain circumstances where, because of their sheer bulk, they may extinguish small fires, but under other circumstances they are known to contribute a fueling effect to existing fires.

It is an object of the present invention to provide a modified calcium lignosulfonate which possesses significant, reliable fire suppressing properties.

It is another object of the invention to provide a modified calcium lignosulfonate which may be used to extinguish fires actually in progress, but which may also be used for the pretreatment of flammable substances to protect against fire.

It is a further object of the invention to provide a new fire retardant material from waste material in a form which is biodegradable, water reducible and non-toxic to 4 plant and animal life.

It is a still further object to provide such fire retardant material in multiple useful forms, including foams, adhesives, and the like.

It is an even further object to provide a modified inexpensive waste material having fire retardant properties of its own but which is compatible with, and useful as an extender for, other known, more expensive fire retardant materials.

Other objects and advantages will become apparent as the specification proceeds.

SUMMARY OF THE INVENTION

This invention is based on the discovery that the fire retardant properties of calcium lignosulfonate can be significantly enhanced by carboxylation, carbonation, or bicarbonation of the molecule to provide it with radicals which are heat releasable as carbon dioxide. More specifically, it has been found that reacting the lignosulfonate with a carboxylating agent such as sodium carbonate, or sodium bicarbonate, or mixtures thereof, produces a modified form of the lignosulfonate which possesses useful fire suppressing characteristics, as will be illustrated in the more detailed description included hereinafter.

The product of the present invention therefore is a fire suppressing composition comprising carboxylated, bicarbonated and/or carbonated calcium lignosulfonate. More particularly, the product comprises the reaction product of calcium lignosulfonate and carbonate of soda. In a preferred embodiment, the product comprises the reaction product of about 0.1 to 0.5 parts by weight of carbonate of soda for each part of lignosulfonate. Useful forms of the product, as well as additional embodiments involving combination with other known fire retardants, will be described as the specification proceeds.

The invention also comprises a new process for extinguishing fires or protecting a flammable surface against fire comprising applying carboxylated calcium lignosulfonate to the fire or to the surface to be protected.

DETAILED DESCRIPTION OF THE INVENTION

Although the invention is applicable to the treatment of lignosulfonates in general, including those resulting from the use of calcium, magnesium, sodium or ammonium bisulfite in the pulping process, the preferred application of the invention involves the use of calcium lignosulfonates, and the invention will be described in terms of such material.

In the preferred practice of the invention, the procedure is initiated by reacting calcium lignosulfonate with sodium carbonate, or sodium bicarbonate, or a mixture thereof. As previously mentioned, calcium lignosulfonate is a readily available, inexpensive raw material. It is a phenylpropane polymer of amorphous structure, characterized by many methoxy groups and some trapped cellulose. Commercial quantities of the material (usually in 56%.-60% aqueous solution) may be obtained from many of the paper companies in the United States. Although the cellulose component which exists in the commercially available versions of the product may be removed by purification techniques, testing of the present invention has established that the presence of the cellulose component contributes a further fire retarding enhancement, and accordingly the cellulose-containing version of the commercially available product is a preferred starting material in the practice of the invention.

The reaction between lignosulfonate and carbonate may be carried out merely by mixing the ingredients in a suitable vessel. The reaction proceeds satisfactorily at room temperature but is assisted by the use of slightly elevated temperatures. The invention is operable within a wide range of proportions of ingredients. For general purposes, the use of from 0.05 to 1 part by weight of the carbonate for each part by weight of calcium lignosulfonate produces satisfactory results. Proportions outside this range are still effective for certain purposes but are subject to diminishing benefits. In the preferred embodiments of the invention, the carbonate is used in the range of about 0.1 to 0.5 parts by weight for each part of calcium lignosulfonate.

The resulting product is a stable solution which may be applied to flammable materials by brush, dip or spray techniques to impart fire retardant properties which are not achieved by separate use of either of the ingredients (see Example 1 below). The solution exhibits no phase separation and retains its color, viscosity and fire retardant properties through storage and freeze/thaw cycle testing. Without being bound to any specific chemical theory with respect to the complex lignosulfonate molecule, it is believed that the reaction results in carboxylation, bicarbonation and/or carbonation of the lignosulfonate material, probably at the site of the numerous methoxy groups, and when the modified lignosulfonate is subjected to the heat of fire, the added carboxyl, bicarbonate and/or carbonate radicals are released as carbon dioxide which acts to blanket and suppress the fire.

The product is biodegradable, water reducible and non-toxic to plant and animal life, and even in highly diluted form prevents burning and smoldering of materials found upon forest floors (i.e., dry pine needles, straw, dried grasses, and the like). Thus, it is available for utilization by forestry services to establish "fire breaks" ahead of forest fires, of the sort currently produced expensively and destructively by bull dozers and fire fighters with shovels, saws and axes. Additional uses include the fireproofing of cellulosic and synthetic fibers in the garment industry; the treatment of lumber, shingles and other materials in the construction industry to render them non-flammable; the fire-proofing of packaging materials; the use as a foam fire retardant at airports and other sites where fuel spills create a fire hazard; and the like.

It is a feature of the invention that the modified lignosulfonate material may be combined with other known chemical fire retardants to provide an inexpensive extender for such retardants. Thus, for example, by first reacting the lignosulfonate with boric acid and then carrying out the reaction with carbonate, as above, a modified lignosulfonate containing lignoborate components is prepared, and the resulting product exhibits enhanced fire suppressing properties in which both the lignosulfonate and lignoborate components contribute to the overall results. Advantageous results are obtained by use of relatively small quantities of the boric acid component, effective ratios of boric acid to lignosulfonate being generally in the range of 0.01–0.08 to 1, based on the weights of the materials.

Similarly, the modified lignosulfonate solution of the present invention may be used to suspend other known chemical fire retardants, such as aluminum oxide trihydrate, to provide an improved means of dispensing the aluminum oxide in which the vehicle or carrier contributes fire suppressing properties of its own. An especially effective composition comprises the lignosulfonate/borate combination described above, including in addition from 0.01 to 0.1 parts of aluminum oxide trihydrate per part of lignosulfonate, based on the weight of the materials.

The lignosulfonate solution is readily adaptable to various forms of application. It is easily diluted with water for uses which require less viscous application, but it may also be thickened with bodying or weathering agents; or it may be produced as a stable foam, if desired; or it may be formulated as an adhesive for use in producing fire retardant paper and laminated products.

In one of the embodiments of the invention, the modified lignosulfonate solution may be combined with thickeners such as sodium metasilicate to produce higher viscosity solutions adapted for brushing on surfaces to produce thicker, more durable or weatherable films.

In another embodiment, the reaction of carbonate with lignosulfonate is carried out by direct addition of carbonate under controlled conditions to produce a reaction product in the form of a stable foam, which persists for many hours and which is effective in airports and similar environments in protecting spilled fuels from igniting.

In a further embodiment, the modified lignosulfonate solution, which is an effective adhesive in itself, may be combined with other compatible adhesives, such as potassium alumino silicate, to provide a fire retardant adhesive useful in the production of cardboard cartons, laminated wood products, particle boards, and the like.

The following examples describe specific embodiments which are illustrative of the invention but should not be interpreted as limiting the scope of the invention in any manner.

EXAMPLE 1

Three separate solutions were prepared, using the following procedures:
- Solution A was a 58% solution of calcium lignosulfonate, diluted 5:1 with tap water.
- Solution B was a saturated solution of sodium hydrogen carbonate,
- Solution C was a 1:1 mixture of Solutions A and B.

Smoldering tests were performed with respect to each of the above solutions. A filter paper (Baker & Adamson grade 'O') was saturated with each of the solutions and dried. Each paper was tested with a glowing cigarette tip. The results were as follows:
- Solution A: A ¼" diameter hole was burned in the paper.
- Solution B: The paper was destroyed.
- Solution C: The paper charred only, did not burn.

EXAMPLE 2

Two separate solutions were provided, according to the following:
- Solution A was a supersaturated solution of sodium hydrogen carbonate prepared by using 47.5 gm of the carbonate in 500 ml of tap water.
- Solution B was a commercially available product comprising a 58% aqueous solution of calcium lignosulfonate.

A modified calcium lignosulfonate was prepared by mixing Solution A with Solution B in a 1:1 ratio, and this preparation was subjected to flammability tests on the following wood building construction materials:
- #1 —Strips of untreated wood, 1 cm thick
- #2 —Lengths of untreated wood, 1.8 cm ×3.6 cm
- #3 —Lengths of untreated wood, 3.9 cm ×8.6 cm
- #4 —Roofing shingles One specimen of each of the above materials was dipped in the 1:1 reaction mixture, dried overnight, and then tested for flammability against similar, but untreated, specimens, with the following results:

| Material | Results |
| --- | --- |
| #1 Untreated Control | Flamed in 1 min. 38 sec. |
| #1 Treated | Charred-did not burn |
| #2 Untreated Control | Flamed in 2 min. 10 sec. |
| #2 Treated | Charred-did not burn |
| #3 Untreated Control | Flamed in 3 min. 41 sec. |
| #3 Treated | Charred-did not burn |
| #4 Untreated Control | Flamed in 2 min. |
| #4 Treated | Charred-did not burn |

Separate quantities of the 1:1 reaction mixture were stored in a freezer for 3 days and then removed and thawed. No physical change was observed in the material. There was no separation of phases, no change in color, and no change in viscosity. Pieces of cardboard partially dipped in the solution and then dried were ignited and found to burn in the untreated areas, but the flame stopped at the margin between treated and untreated areas. After an additional week in the freezer, the reaction mixture exhibited no apparent decomposition and no change in fire retardant effect.

EXAMPLE 3

Using Solution A and Solution B of Example 2 in various ratios, reaction mixtures of the modified calcium lignosulfonate material were prepared and tested on samples of various materials characteristic of forests, wilderness areas, and industry. In each test, a sample of treated material was treated against a sample of untreated material by exposing the materials to open flame. The results were as follows:

| Material | Ratio of Solution A to Solution B | Results |
| --- | --- | --- |
| Sagebrush (untreated) | | Burned completely |
| Sagebrush (treated) | 1:1 | Stopped flame |
| Dry straw (untreated) | | Burned completely |
| Dry straw (treated) | 1:1 | Stopped flame |
| Pine needles (untreated) | | Burned completely |
| Pine needles (treated) | 2:1 | Stopped flame after 5% burn |
| Pine needles (treated) | 10:1 | Stopped flame after 30% burn |
| Laundry lint (untreated) | | Smoldered until total destruction |
| Laundry lint (treated) | 10:1 | Flame stopped at treated edge |
| Fibrous packing material | 2:1 | Stopped flame at treated edge |
| Styrofoam | 2:1 | Did not stop flame at first, but flame slowly died after 50% burn |

EXAMPLE 4

In a 250 ml beaker, 11 grams of sodium carbonate ($Na_2CO_3$) and 11 grams of sodium hydrogen carbonate ($Na_2HCO_3$) were dissolved in water. In another 250 ml beaker, 240 ml of calcium lignosulfonate 58% in water was treated with 10 grams of boric acid. 40 ml of each solution was then mixed at 110° F., and held at that temperature for two hours. Cardboard strips were then dipped into the reacted, extended solution, dried for two hours at 350° F. and tested for flammability. They proved to be fireproof at the temperature of burning cardboard.

Test panels of Douglas Fir, grade "C", were treated with the substituted and extended lignosulfonate, dried overnight and then tested in a version of the ASTM standard test method for surface burning characteristics of building materials, designation E-84-88 Tunnel Test, and contrasted against similar but untreated panels. Although the untreated panels were totally burned in 10 minutes, the treated panels only charred at the point of flame contact and in no case did the burned area exceed 30% within the 10 minute time interval allowed.

EXAMPLE 5

A solution of reacted and extended lignosulfonate similar to that of Example 4 was prepared, but in addition 10 grams of alumina trihydrate ($Al_2O_3 \cdot 3H_2O$) were added to the beaker containing the calcium lignosulfonate and boric acid. Test strips of wood were coated with this material, dried, and subjected to the Tunnel Test described in Example 4. The treated materials obtained "A" or "B" ratings in the test but yielded a lesser volume of smoke.

EXAMPLE 6

A modified lignosulfonate material was prepared by mixing Solution A and Solution B of Example 2 in a 1:1 ratio 200 ml of this material was mixed with 40 grams of sodium metasilicate ($Na_2SiO_3$) to provide a more viscous solution. The solution was applied to wood panels by brushing a film approximately 0.03 mils on the surface. Upon burning in the Tunnel Test described in Example 4, the panels were found to be 100% non-combustible, whereas control untreated panels were 95% burned.

EXAMPLE 7

A sample of relatively pure calcium lignosulfonate was obtained. The purification process consisted primarily of removing most of the partially combined cellulose. A standard solution of modified calcium lignosulfonate was prepared from this purified material, in accordance with the present invention, and the resulting product was compared with modified lignosulfonate prepared from regular commercially available calcium lignosulfonate containing greater proportions of trapped cellulose. The modified lignosulfonate prepared from the purified material proved to be fire retardant, but was approximately 20% less effective than modified lignosulfonate prepared from the unpurified regular commercially available material.

EXAMPLE 8

Additional quantities of Solution A and Solution B were prepared as in Example 2, and modified lignosulfonate preparations were prepared according to the present invention by mixing Solution A and Solution B in ratios of 2:1, 3:1, 4:1, 5:1 and 6:1. Using each of these resulting products, filter paper smoldering test samples and cardboard burn samples were prepared. Upon testing, the products in each of the above ratios were found to possess fire retarding properties and to be stable under extended storage and low temperature conditions.

EXAMPLE 9

In a large container designated "A", two pounds of sodium carbonate and two pounds of sodium hydrogen carbonate were mixed with 2¼ gallons of water. In a large container designated "B", 2½ gallons of 58% commercial grade calcium lignosulfonate were mixed with ½ pound of alumina trihydrate, 0.1 pound of Busan 11M1 (a suspension agent) and 0.1 pound of boric acid. The "A" component was slowly added to the "B" component. Foaming occurred as carbon dioxide was released from the carbonate and bicarbonate. The resulting product was tested in filter paper smoldering tests, cardboard burn tests, and tunnel tests for wood panels and found to possess effective fire retarding properties.

EXAMPLE 10

250 ml of undiluted 58% commercial grade calcium lignosulfonate was treated by the direct addition of 10.8 grams sodium hydrogen carbonate. A stable foam product resulted which doubled the original volume of the ingredients and which prevented kerosene from igniting when spilled upon its surface. The foam remained for 1½ hours and was still evident upon the surface after 16 hours.

EXAMPLE 11

An adhesive was prepared by reacting a solution of potassium silicate (80%) with $Al_2O_3$ (18%) in the presence of potassium hydroxide. The reaction mixture was allowed to cure for 4 hours at 70° F., and the resulting product was a complex alumino silicate, a brittle material having slight fire retarding properties. This material was plasticized by adding an equal quantity of a modified lignosulfonate prepared by mixing Solution A and Solution B of Example 2 in a 1:1 ratio. The resulting plasticized adhesive was superior in fire fighting properties to the alumino silicate.

Although various preferred embodiments of the invention have been described herein in detail it will be understood by those skilled in the art that variations may be made thereto without departing from the spirit of the invention.

What is claimed is:

1. A fire suppressing composition for the pretreatment of flammable substances to protect against fire comprising an aqueous solution containing one part of lignosulfonate obtained from spent liquor of the sulfite-pulping process and from 0.1 to 0.5 parts by weight of carbonate of soda, said composition comprising chemically modified lignosulfonate containing radicals which are heat releasable as carbon dioxide.

2. The fire suppressing composition of claim 1 wherein said radicals are selected from the group consisting of carboxyl, bicarbonate, carbonate, and mixtures thereof.

3. The fire suppressing composition of claim 1 wherein said carbonate of sodium is sodium carbonate.

4. The fire suppressing composition of claim 1 wherein said carbonate of sodium is sodium hydrogen carbonate.

5. The fire suppressing composition of claim 1 wherein the said composition includes cellulose.

6. The fire suppressing composition of claim 1 wherein the said composition includes boric acid or salts thereof.

7. The fire suppressing composition of claim 1 wherein the said composition includes aluminum oxide.

8. The fire suppressing composition of claim 1 wherein the said composition includes a weathering agent.

9. The fire suppressing composition of claim 8 wherein the said weathering agent is sodium metasilicate.

10. The fire suppressing composition of claim 1 wherein said composition is in the form of an adhesive.

11. A liquid fire suppressing composition for the pretreatment of flammable substances to protect against fire comprising a solution containing lignosulfonate obtained from spent liquor of the sulfite-pulping process, carbonate of soda, and boric acid or the salts thereof, the concentration of carbonate of soda being in the range from 0.2 to 0.5 parts by weight for each part of lignosulfonate, and the concentration of boric acid or salts thereof being from 0.01 to 0.08 parts by weight for each part of lignosulfonate.

12. The liquid fire suppressing composition of claim 11 wherein aluminum oxide is suspended in said solution, the concentration of aluminum oxide being from 0.01 to 0.1 parts by weight for each part of calcium lignosulfonate.

13. The liquid fire suppressing composition of claim 11 wherein said solution contains sodium metasilicate.

14. The liquid fire suppressing composition of claim 11 wherein said composition includes cellulose.

15. A method for protecting a flammable surface against fire comprising applying to said surface, and allowing to dry thereon, a fire suppressing composition comprising an aqueous solution containing 1 part of lignosulfonate obtained from spent liquor of the sulfite-pulping process and from 0.05 to 1 part of carbonate of soda, said fire suppressing composition comprising modified lignosulfonate containing radicals which are heat releasable as carbon dioxide, whereby said surface is blanketed with released carbon dioxide when subjected to the heat of fire.

16. The method of claim 15 wherein said radicals are selected from the group consisting of carboxyl, bicarbonate, carbonate, and mixtures thereof.

17. The method of claim 15 wherein said composition is applied as a liquid spray.

18. A method for protecting a flammable surface against fire comprising applying to said surface, and allowing to dry thereon, a fire suppressing composition comprising an aqueous solution containing lignosulfonate obtained from spent liquor of the sulfite-pulping process, carbonate of soda, and boric acid or salts thereof, said carbonate of soda being present in said composition in a concentration within the range of 0.2 to 0.5 parts by weight for each part of lignosulfonate, and said boric acid or salts thereof being present in a concentration within the range from 0.01 to 0.08 parts by weight for each part of lignosulfonate.

19. The method of claim 18 wherein aluminum oxide is included in said composition in a concentration within the range from 0.01 to 0.1 parts by weight for each part of calcium lignosulfonate.

20. The method of claim 18 wherein sodium metasilicate is included in said composition.

21. A fire-protected material having on its surface a dried coating of a fire suppressing composition comprising 1 part of lignosulfonate and from 0.05 to 1 part of carbonate of soda, said fire suppressing composition comprising modified lignosulfonate containing radicals which are heat releasable as carbon dioxide.

* * * * *